United States Patent [19]
Charron

[11] Patent Number: 6,144,863
[45] Date of Patent: *Nov. 7, 2000

[54] ELECTRONIC DEVICE WITH SCREEN COMPRISING A MENU WHICH CAN BE CUSTOMIZED BY A USER

[75] Inventor: Didier Charron, Rouillon, France

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/975,384

[22] Filed: Nov. 20, 1997

[30] Foreign Application Priority Data

Nov. 26, 1996 [FR] France .................................. 96 14474

[51] Int. Cl.⁷ ...................................................... H04G 7/20
[52] U.S. Cl. ........................................... 455/566; 455/575
[58] Field of Search ..................................... 455/575, 566, 455/564, 565, 410, 411; 345/352, 353, 356, 333, 334, 336, 146, 348, 349, 350

[56] References Cited

U.S. PATENT DOCUMENTS

| | | | |
|---|---|---|---|
| 4,817,194 | 3/1989 | Andros, Jr. ............................... | 455/154 |
| 5,381,463 | 1/1995 | Baals et al. ............................... | 379/96 |
| 5,396,264 | 3/1995 | Falcone et al. .......................... | 345/146 |
| 5,488,650 | 1/1996 | Greco et al. ............................... | 379/67 |
| 5,708,787 | 1/1998 | Nakano et al. .......................... | 395/352 |
| 5,737,393 | 4/1998 | Wolf ........................................... | 379/67 |
| 5,748,899 | 5/1998 | Aldrich ............................... | 395/200.52 |
| 5,784,059 | 7/1998 | Morimoto et al. ...................... | 345/353 |
| 5,933,484 | 8/1999 | Partridge, III .......................... | 379/201 |

FOREIGN PATENT DOCUMENTS

| | | |
|---|---|---|
| 0322332A2 | 6/1989 | European Pat. Off. . |
| 0607731A2 | 7/1994 | European Pat. Off. . |
| 9602813 | 3/1996 | France . |
| 2731578 | 9/1996 | France . |
| 2162393A | 1/1986 | United Kingdom . |

Primary Examiner—Nguyen Vo
Assistant Examiner—N. Mehrpour
Attorney, Agent, or Firm—Dicran Halajian

[57] ABSTRACT

A telephone is disclosed having a memory which stores a full menu and a customization unit which customizes the full menu to form a custom menu. The customization unit includes a masking device which masks selected items of the full menu to form the custom menu. A screen displays the custom menu. A keyboard has a key which manually controls the masking device. Further, a counter counts the number of times items of the full menu are accessed by a user to determine the selected items. In particular, the selected items are the least frequently accessed elements of the menu by the user. The counter controls the masking device to mask the selected items.

15 Claims, 6 Drawing Sheets

| 38 | |
|---|---|
| 1 | "Y" |
| 2 | "y" |
| 3 | "N" |
| 4 | "n" |
| 5 | "Y" |

| 68 | |
|---|---|
| 1 | 100 |
| 2 | 50 |
| 3 | 20 |
| 4 | 0 |
| 5 | 0 |

A

| 38 | |
|---|---|
| 1 | "Y" |
| 2 | "Y" |
| 3 | "N" |
| 4 | "n" |
| 5 | "y" |

| 68 | |
|---|---|
| 1 | 100 |
| 2 | 100 |
| 3 | 100 |
| 4 | 100 |
| 5 | 100 |

ELECTRONIC DEVICE WITH SCREEN COMPRISING A MENU WHICH CAN BE CUSTOMIZED BY A USER

BACKGROUND OF THE INVENTION

The invention relates to an electronic apparatus with screen, comprising:

a memory for storing a menu formed by menu elements which can be configured by a user by means of adjustable parameters, a display device for displaying said menu on the screen, a customization unit for customizing the display of said menu.

Current electronic devices with screen, notably corded or portable telephones, provide an ever larger selection of functions for the user. For example, a great many radio telephones propose functions of voice messaging, call transfer, adjustment of many parameters such as sound level, type of ringing, activation of a light signal for indicating the discharge of the battery, etc.

However, most of the users of these devices frequently use only a small number of their functions. On the one hand, because they do not need all the proposed functions, or the trouble to study the documentation of the device seems relatively much to them compared to the benefit they expect from it, on the other hand, because the price of subscription to certain of these functions is considered excessive. Thus, many users subscribe to a minimum of functions necessary for their personal use, although all these functions appear on the menu of their device. Consequently, these standard menus are revealed while being ill-adjusted to daily and efficient use by most of the users.

Therefore, examinations have been carried out with the object of facilitating the use of the menus of these devices intended for the public at large.

A menu system which can be defined by the user is known from French patent published under No. 2731578. It permits the user of creating his own menu by selecting in a standard menu the elements he needs most and copy them in a personal menu. The impatient user could thus nearly immediately have access to the function he searches for by means of his personal menu.

Such a menu system, although it proposes to the user a reduced-size menu which can thus be used more rapidly, nevertheless has drawbacks.

A first drawback is formed by the fact that creating the personal menu provides for reserving the necessary storage place of said menu in the memory of the device. In fact, these elements which are copied from the standard menu are redundant and increase the memory quantity necessary for the storage of the menu. The storage capacity of the devices of this type being limited, the size of the personal menu is therefore limited too. Finally, and this forms the second drawback, the programming of this personal menu is not made easy for a public that is not experienced and first of all looks for a simple use of their device. Moreover, in the case where the device is loaned, its proprietor may find back his personal menu changed and has to reprogram same.

OBJECTS AND SUMMARY OF THE INVENTION

It is an object of the present invention to largely remedy these drawbacks and provide an electronic device with screen comprising a menu system which allows of being configured according to the user's needs which is economic in terms of memory space and of which the handling is simple and fast.

Therefore, an apparatus of the type defined in the opening paragraph is characterized in that said customization unit comprises:

a locking/unlocking device for locking/unlocking parameters of the menu elements, a display/masking device cooperating with the locking/unlocking device for selectively displaying (masking, respectively) the menu elements whose parameters are unlocked (locked, respectively).

According to a highly interesting characteristic feature of the invention, an apparatus of the type defined above, moreover comprising a keyboard with a set of keys, is characterized in that a first mode of use of said apparatus is provided, called manual mode, in which the locking/unlocking device is controlled by at least one key of said keyboard.

In this manual mode, the user himself configures the standard menu according to his own needs with the aid of the keyboard of his apparatus.

According to another highly interesting characteristic feature of the invention, an apparatus of the type already mentioned is characterized in that a second mode of use of said apparatus is provided, called automatic mode, in which a statistical counter device of the user rate of the elements of the menu cooperates with the locking/unlocking device to unlock (lock, respectively) automatically the parameters of said menu elements which are used the most (the least, respectively) frequently.

In this automatic mode, said menu is automatically configured as a function of the frequency of use of each menu element. This counter device may advantageously comprise computation means which use fuzzy logic as described in French patent filed by the applicants under No. 9602813 on Mar. 6, 1996. Thus, an apparatus of the type mentioned above is characterized in that the statistical counter device comprises:

modeling means for modeling the behavior of the user when he passes through the menu, adaptation means for adapting said menu for taking said behavior into account.

According to the invention, a parameter of an element of the standard menu is assigned and the decision to display said element on the screen is made in the manual mode in a single operation. In the automatic mode, the elements which have already been configured that are used the least are automatically left out from the display of the standard menu. In the two modes, the user has an abridged menu in which it is easier to find the function he frequently selects in order to set its parameters.

This menu system also permits of optimizing the use of the memory because copies are not made. The elements to be displayed are selected according to the function: user's choices in the manual mode, frequency of use of these elements in the automatic mode. In addition, in a highly advantageous manner the invention permits of restricting the number of elements of the menu in order to deny access to certain functions to an occasional user, or to prevent him from modifying the locked parameters.

These and other aspects of the invention will be apparent from and elucidated with reference to the embodiments described hereinafter.

BRIEF DESCRIPTION OF THE DRAWINGS

In the drawings:

FIG. 3 shows:

in A, a block diagram illustrating a circuit of the apparatus shown in FIG. 1, in B, a table of data illustrating at a given instant the contents of the memory 32 which forms part of the circuit shown in A.

DETAILED DESCRIPTION OF THE PREFERRED EMBODIMENT

Figure 1:
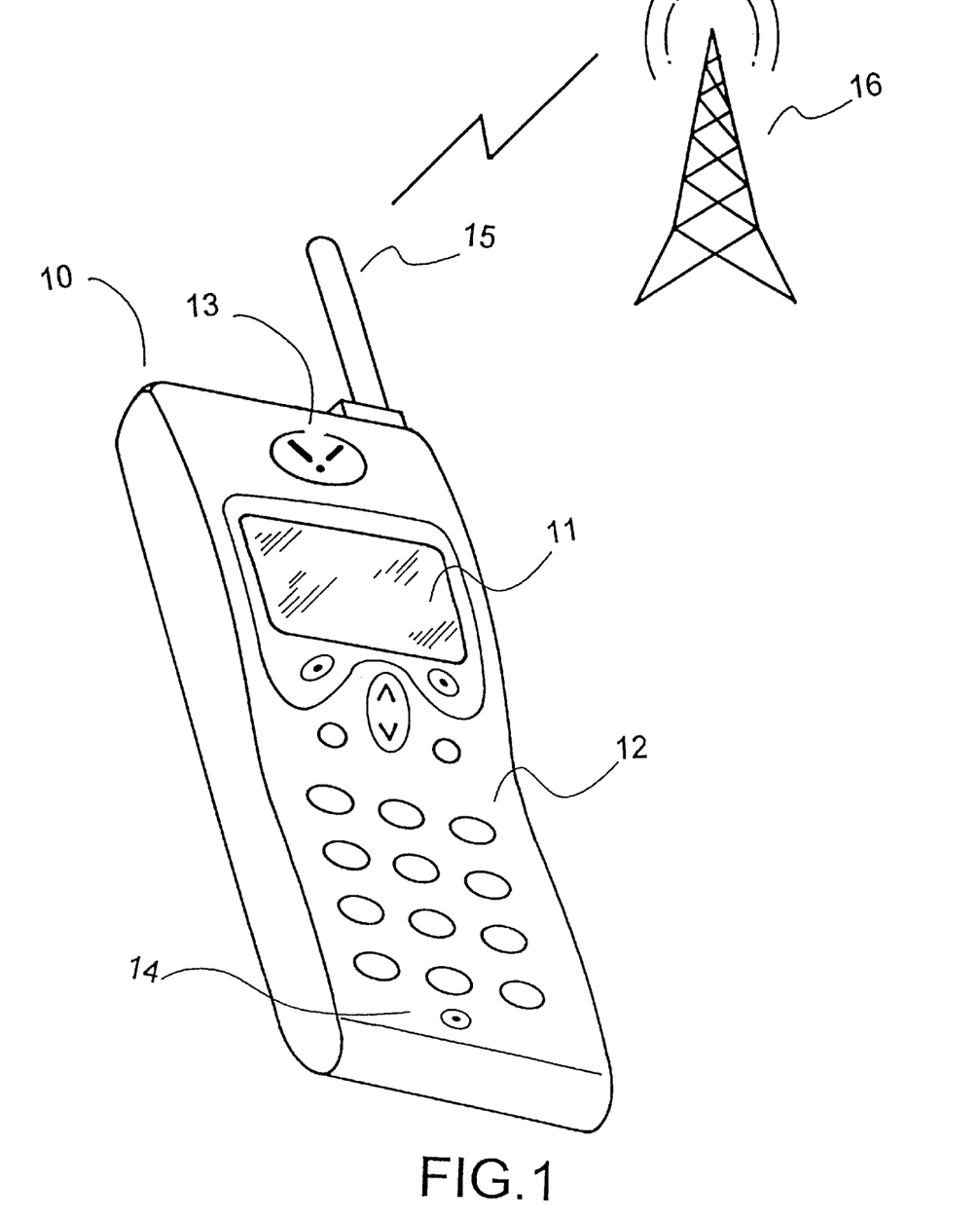
FIG. 1 shows an example of the electronic apparatus with screen according to the invention.

The electronic apparatus shown in FIG. 1 is a radio telephone, but the customized menu system may be applied to any other electronic apparatus having a processor, a memory, a display system and a keyboard.

Figure 2:
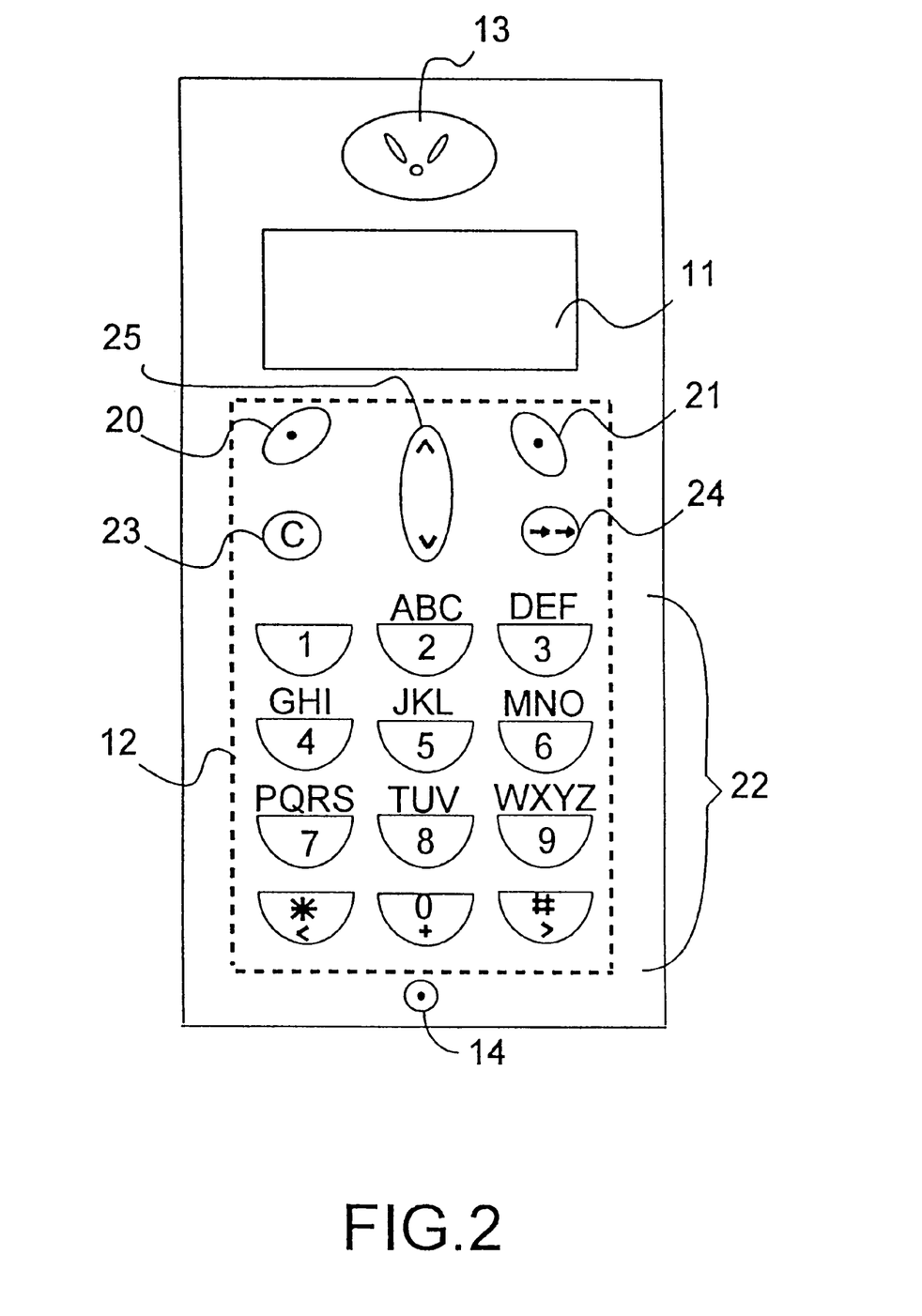
FIG. 2 shows a front elevation of the apparatus shown in FIG. 1.

The radio telephone shown in FIG. 1 comprises a housing 10 which encloses electronic circuits including that represented in FIG. 2, a screen 11, a keyboard 12, an earphone 13, a microphone 14, a transceiver device (not shown) cooperating with an antenna 15 for exchanging radio signals with a base station 16. The keyboard 12 comprises two types of keys: permanent keys which have the same function whatever the contents of the menu used, and contextual keys whose function depends on the element of the displayed menu. This function is displayed on the screen above the key to be depressed.

In a preferred embodiment of the invention shown in FIG. 2, the keyboard 12 comprises two contextual keys 20 and 21 of which one, 20, has three functions, and the other, 21, has two. According to the context the key 20 permits of accessing the menu by the MENU function, leaving a program by the LEAVE function and invalidating a choice by the NO function. The key 21 permits of selecting a menu element by the OK function and validating a choice by the YES function. The other keys are permanent. In addition to the alphanumeric keys 22, a correction key 23 and a key 24 for automatically resetting the last depressed number, the keyboard comprises a direction key 25 (an arrow-head pointing up and an arrow-head pointing down) which permits of scrolling the elements of the menu on the screen 11. The contextual keys OK, YES and NO make it also possible to activate a locking/unlocking device represented in FIG. 3 to "lock" or "unlock" the parameter of the element of the menu previously selected with the aid of the OK key.

Figure 3:
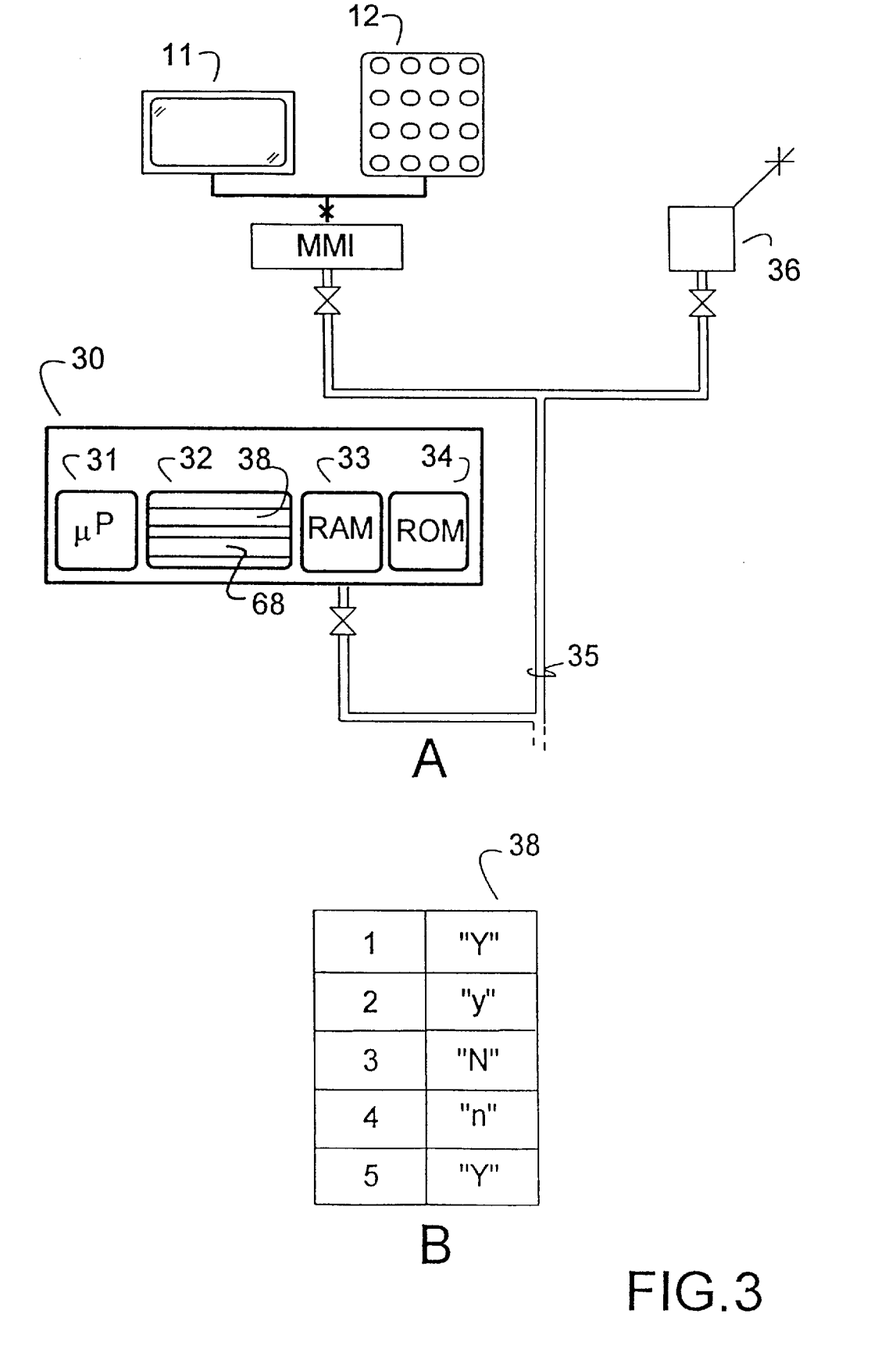

FIG. 3 shows the operation of the locking/unlocking and display/masking devices. From a hardware point of view, these devices use the same electronic components, which explains why they are represented in FIG. 3A by a single diagram. This shows how the control element 30 and the man/machine interface MMI formed by the screen 11 in the keyboard 12 cooperate for using the said customization units of the menu.

The control element 30 is formed by a processor 31, an electrically erasable programmable read-only memory 32 EEPROM, a random access memory 33 RAM and a read-only memory 34 ROM. The main operation program of the apparatus and the various menu elements are stored in the ROM 34. The RAM 33 is used in parallel with the ROM 34 for positioning the desired variables.

The parameter data of the menu elements are stored in EEPROM 32 to be modified by the user. A bus network 35 contains an interruption bus for transmitting the signals from the keyboard 12 to the processor 31, and a serial bus of the IIC type (Inter Integrated Circuit) meant for signals conveyed between the processor 31, the EEPROM 32 and the screen 11. The IIC bus selectively directs the data coming from the processor 31 to their destination EEPROM 32 or the screen 11, depending on whether they are to be stored or displayed. Via the data bus network 35, the control element 30 receives the input signals from the keyboard 12 to read the data from the various memories 32, 33 and 34, display them on the screen 11 and write as required, data into the EEPROM 32.

A transceiver device 36 cooperates with the devices described above for connecting the user to the radio telephone network.

The data from the EEPROM 32, which correspond to the parameters of the menu elements the user wishes to modify, are stored in table 38 represented in B in FIG. 3. These parameters are referenced in the left column by a number. A flag which is capable of assuming four values is associated to each numbered parameter and is updated in the right column by the processor 31 as a function of the information it receives from the keyboard 11. Each flag sends a signal having processor 31 as its destination to trigger the display/masking device. The four available flag values correspond to four states in which the user can place the parameters of the elements of his menu. In B in FIG. 3:

"Y" represents the state "valid/locked",

"N" represents the state "invalid/locked",

"y" represents the state "valid/unlocked",

"n" represents the state "invalid/unlocked".

The "y" and "n" flags send a signal to display on the screen 11 the parameters to which they are assigned. In the example shown, only the parameters of the second and fourth lines of the table 38 FIG. 6, A, will be displayed on the screen 11.

The operation in the manual mode of the customization unit for adjusting the parameters of the menu elements will now be described with reference to FIGS. 2 and 3 from the input of the data by the keyboard 12 to their display on the screen 11. The description will be based on examples of recordings in the table 38 of the memory 32.

In a preferred embodiment of the invention, a depression of certain keys of the keyboard 11 (the keys 20 and 21 represented in FIG. 2) triggers a timing which is synchronized with the internal timer of the processor 31 which permits the processor 31 to evaluate the depression time of said key 20 or 21 and to transmit the corresponding signal for carrying out the routine corresponding to the instruction of the keyboard 11.

For example, a long (short, respectively) depression of the contextual YES key (key 21) of the keyboard 12 indicates to the processor 31 that it is to assign the flag "Y" ("y", respectively) in table 38 to the parameter that corresponds to that displayed on screen 11, to put the parameter in the "locked" ("unlocked", respectively) mode. Similarly, a long (short, respectively) depression of the NO key (key 20) indicates to the processor that is to assign the flag "N" ("n", respectively) in table 38 to the parameter that corresponds to the parameter displayed on the screen 11 to the parameter in the "locked" ("unlocked", respectively) mode.

As indicated above, the control element 30 also controls the display/masking device that cooperates with the locking/unlocking device by the data IIC bus for masking (displaying, respectively) on screen 11 the menu elements whose parameters are locked (unlocked, respectively), that is to say, assigned to the flags "Y" or "N" ("y" or "n", respectively).

Figure 4:
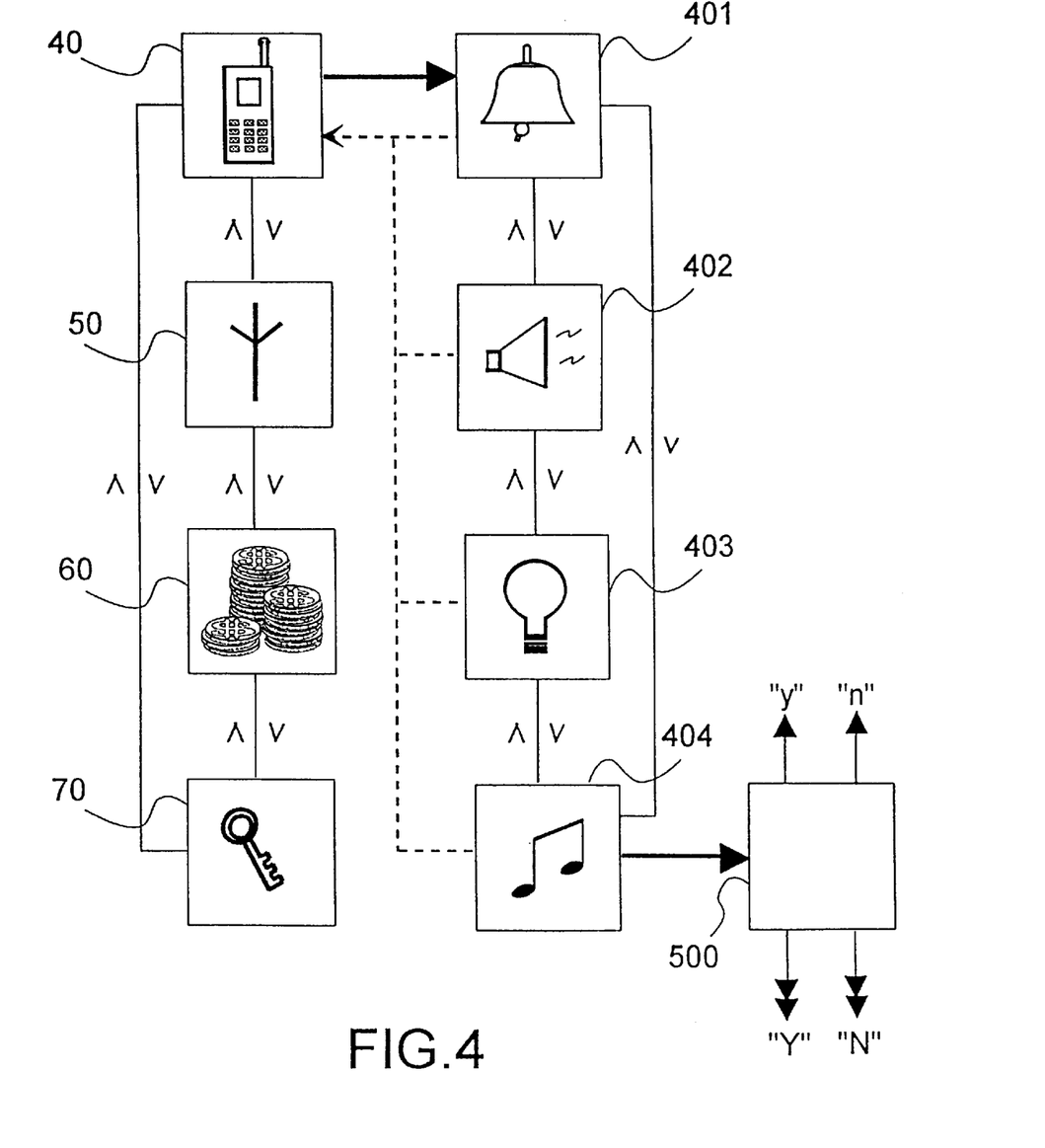
FIGS. 4 and 5 represent a flow chart illustrating the operation of the system of the personal menu in two different configurations.
Figure 5:
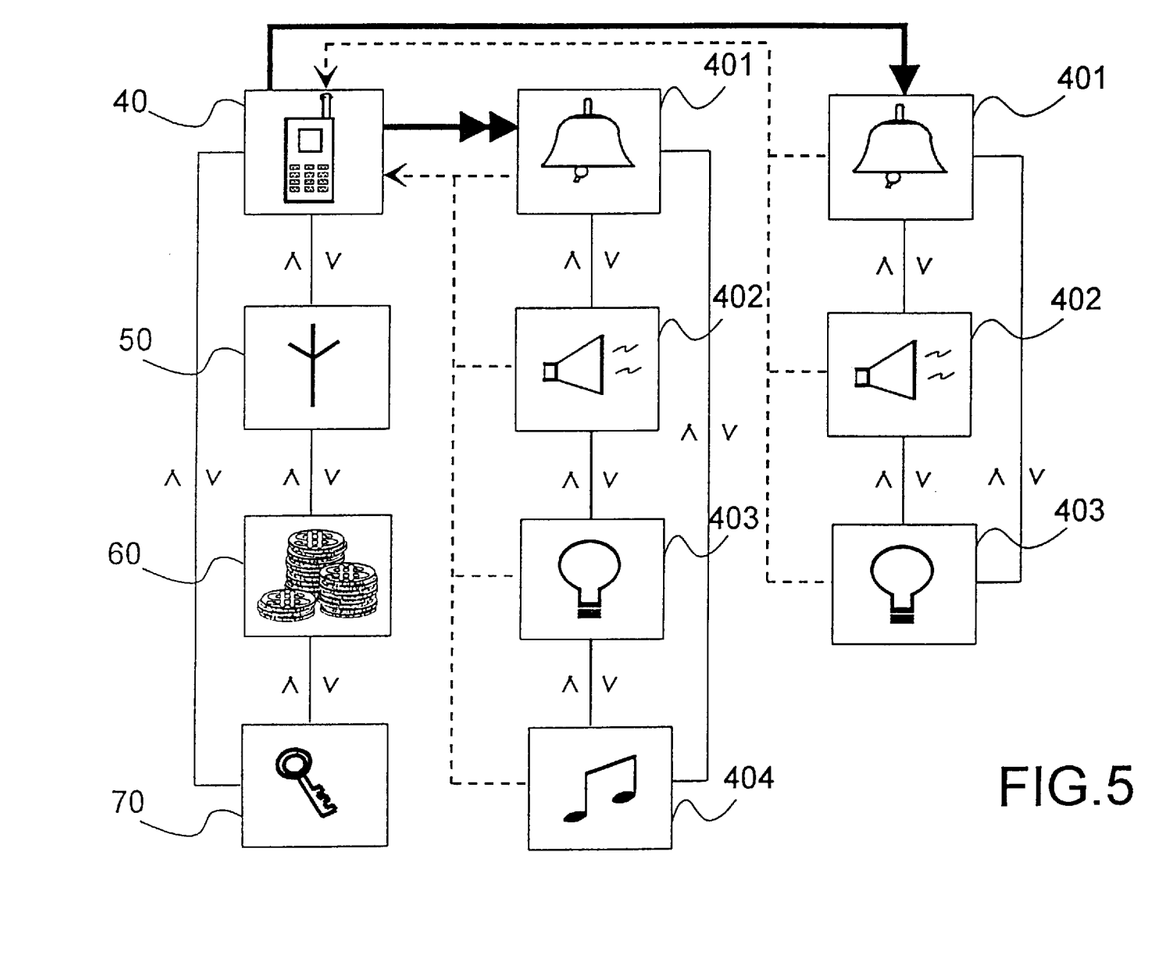

The flow charts of the FIGS. 4 and 5 illustrate in an example of a menu the operation in the manual mode of the customization unit.

The example shown in FIG. 4 comprises sub-menus of which the list of elements is represented by squares identified by icons symbolizing the function. The squares 40, 50, 60 and 70 designate sub-menus comprising each various parameter elements. The square 40 designates the menu for setting the parameters corresponding to configuration options of the MMI interface. The square 50 designates the menu of the network of the radio telephone operator. The square 60 designates the call control menu permitting of displaying statistical data, for example, the average duration of a call, etc. The square 70 designates the security menu permitting of limiting the access of one's telephone to third parties, for example, by requiring a secret code for making calls.

The arrow heads $_\wedge$ and $_\vee$ on either side of the thin lines indicate that the processor 31 sequentially displays the menu elements when the user actuates the direction key 25 shown in FIG. 2. The bold-type arrow heads indicate that the menu element represented by the dotted square is selected by the contextual OK key of the keyboard 12. The dashed-line arrow heads indicate that the processor 31 may at any moment come back to the sub-menu head element via the contextual OUT key.

Via the element 401 to 404 of menu 40, selected by the OK key of the keyboard, the user may choose the type of ringing of his apparatus (401) or its volume (402), lighten the keys of the keyboard (403) or making them heard when one depresses them (404). In the example of FIG. 4, the element 404 has been selected. For simplicity, it is considered that this menu element has only one parameter. The processor 31 then displays a menu screen represented by the decision square 500 for proposing four possibilities "y", "n", "Y" and "N" to the user for assigning element 404 to a parameter that corresponds to four flag values available in the table 38. The processor 31 assigns the flag "y" ("n", respectively) when the contextual YES key (NO, respectively) is activated by a brief depression (pointed arrow head) and the flag "Y" ("N", respectively) when the contextual YES key (NO, respectively) is activated by a long depression (double-pointed arrow head).

If the parameter of the element 404 often changes, the user may find it suitable not to lock the parameter so that said element is displayed on the menu of the apparatus. In that case he briefly presses the contextual YES key (NO, respectively) to instruct the processor 31 to assign the flag "y" ("n", respectively) to the parameter of the element 404 in the table 38 to make the keyboard of his telephone audible (or silent, respectively) in the "unlocked" mode. The flag "y" ("n", respectively) thus generates a signal for instructing the processor 31 to activate the display/masking device, so that the parameter of the element 404 is displayed on the menu.

On the other hand, if the user rarely changes this parameter or wishes to prevent a third party from changing it, he can lock this parameter so that it does not show on the menu of the apparatus. He then depresses the contextual YES key (NO, respectively) for a longer period to instruct the processor 31 to assign the flag "Y" ("N", respectively) to the parameter, which flag then generates a control signal at the processor 31 for activating the display/masking device, so that said parameter is not displayed on the menu.

FIG. 5 gives a detailed representation of the operation of the processor 31 to make the element 404 appear again on the menu and unlock it as required. Therefore, the sub-menu 40 in which the locked element 404 is found is first to be selected by the keyboard followed by a long depression of the OK key represented by a double bold-type double-pointed arrow head, followed by brief depressions of the scroll keys instructing the processor 31 to sequentially display all the elements of the standard menu among which is found the sought element. The process which then makes it possible to activate/deactivate said element in the locking/unlocking mode is identical to that described with reference to FIG. 4. On the other hand, a brief depression of the OK key when a sub-menu is selected, makes it possible to display only the non-locked elements.

An embodiment of the menu customization unit in the automatic mode will now be described.

Figure 6:
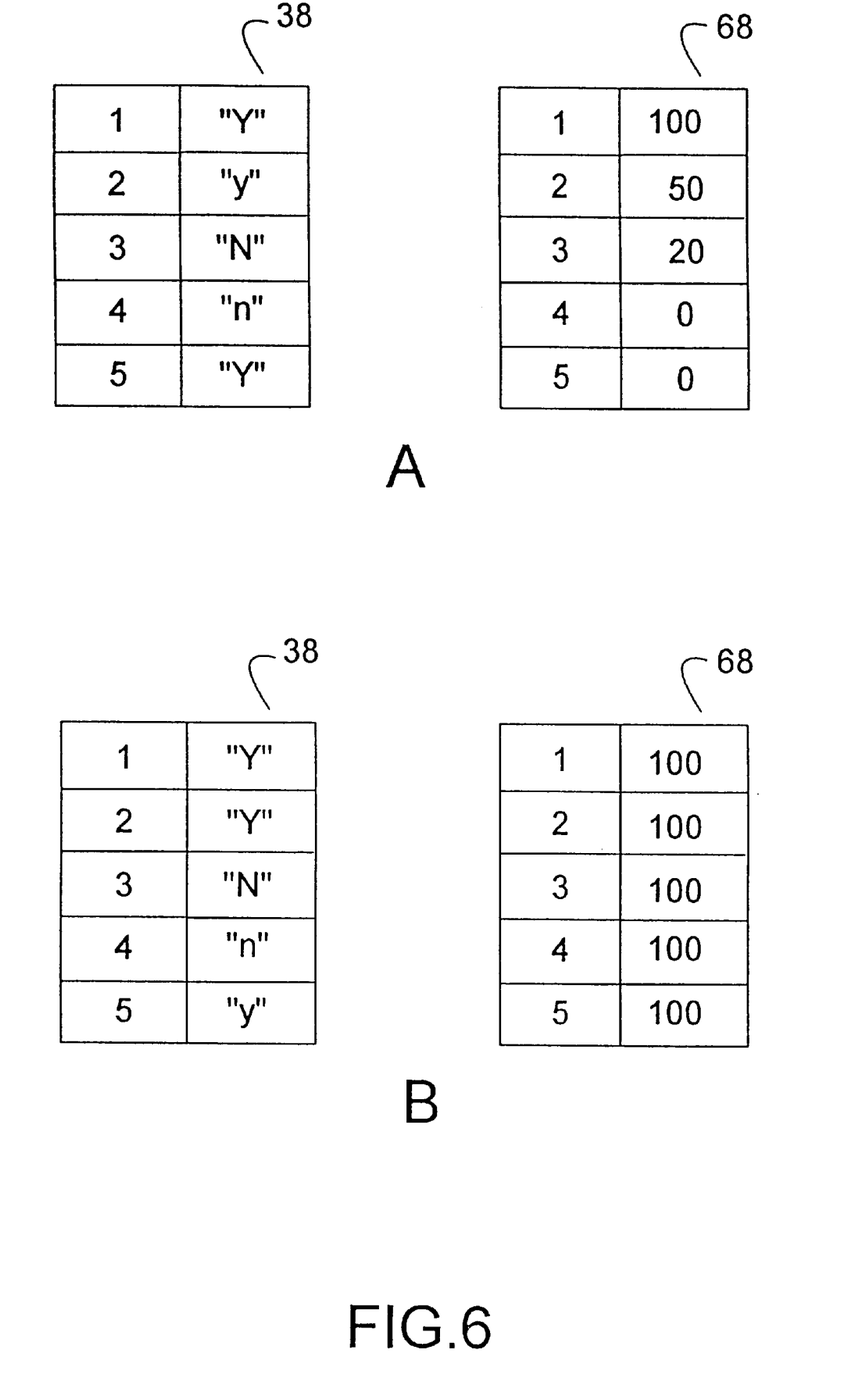
FIG. 6 shows in A and B two tables of data illustrating the contents of the memory 32 at two different instants.

FIG. 6 illustrates the operation of the statistical counter device of the degree of utilization of the various elements of the menu cooperating with the locking/unlocking device (illustrated by table 38 in FIG. 3) for automatically putting the parameters of said most frequently used (least used) menu elements in the "unlocked" ("locked", respectively) mode. The data of the EEPROM 32 corresponding to said parameters are stored in a table 68 and referenced in the left column just like table 38 represented in B in FIG. 3.

One counter is associated to each parameter of the table 68, also referenced in the table 38 under the same number. It is put in the standard mode at a maximum initial value when the apparatus is switched on for the first time and is periodically initialized by the processor 31. Between two successive initializations, the value of the counter diminishes by unity under the influence of the processor 31 each time the counter receives from the keyboard 12 an instruction to modify in table 38 the value of the flag which symbolizes the state of the parameter associated to the counter.

The switching off of the apparatus cuts off the power supply of the processor, thus stops all the mechanisms synchronized with its clock. More particularly, the counters are frozen until the next time the apparatus is switched on. If the value of the counter is not made equal to zero between two starts, the processor 31 locks its parameter, that is to say, it assigns in table 38 the flag "Y" instead of the flag "y" or the flag "N' instead of the flag "n". On the other hand, if the value of the counter becomes zero, the processor 31 unlocks the associated parameter by assigning in the table 38 the flag "y" instead of the flag "Y" and the flag "n" instead of the flag "N". If the correct flag has already been used, the processor 31 does not do anything. It may be considered that the maximum value of the counter and also its initialization period may be determined by the user via his keyboard.

Just like the manual mode, the display/masking device is also used in the automatic mode by the processor 31 for masking the locked parameters on the screen.

The contents of the tables 38 and 68 are illustrated at two instants t1 and t2 in respectively A and B for an example of five parameters of menu elements. While the clock of the processor 31 forms the time reference, the instants t1 and t2 are one clock pulse apart. An initialization of the counters is effected at instant t2.

At instant t1, just preceding said initialization, the counters of the first three parameters of the tables 38 and 68 have a non-zero value, whereas those of the two last parameters have a zero value. The three first parameters thus have been changed less frequently by the user than the last two parameters.

At instant t2, all the counters of the table 68 are initialized at the maximum value, taken to be equal to 100 in the example shown in the Figure. The processor 31 thus locks ("Y" replaces "y") the parameter of the second row of the table 38 of which the counter indicates rare changes and unlocks ("y" replaces "Y") that of the fifth row of which the counter indicates frequent changes. On the other hand, the processor leaves the other parameters in the state they had at the instant t1, which corresponds to their real frequency of use.

Thus, an electronic apparatus with screen has been described comprising a menu intended to be customized in easy fashion to be adapted to the daily or occasional use of all types of users.

Consequently, the invention is not restricted to embodiments that have just been described and represented. Other variants of embodiments of the invention may be found by those skilled in the art, for example, with respect to the operation of the keyboard, the display or the locking/unlocking device. More particularly, the statistical counter for counting the user rate of the menu elements for utilizing the automatic mode may be changed for taking account of other data, notably relating to the behavior of the user when he runs through the menu. All these variants do not lie outside the scope of the invention.

What is claimed is:

1. An electronic apparatus comprising:
   a memory which stores a full menu;
   a customization unit which customizes said full menu to form a custom menu, said customization unit including a masking device which masks selected items of said full menu to form said custom menu;
   a screen which displays said custom menu; and
   a counter having a count which is initialized with a first predetermined count, said count being diminished in response to accessing a flag of one of said selected items, said one of said selected items being displayed on said screen when said count diminishes to a second predetermined count.

2. The electronic apparatus of claim 1, wherein said custom menu includes less items than said full menu.

3. The electronic apparatus of claim 1, further comprising a keyboard having a key which manually controls said masking device.

4. The electronic apparatus of claim 1, wherein said counter counts a number of times items of said full menu are accessed by a user to determine said selected items, said selected items being least frequently accessed elements of said full menu by said user, said counter controlling said masking device to mask said selected items.

5. The electronic apparatus of claim 1, wherein said counter counts a number of times items of said full menu are accessed by a user; and wherein said counter includes a modeling device which models behavior of said user when accessing said items, and an adaptation device which adapts said custom menu in response to said behavior.

6. The electronic apparatus of claim 1, wherein said electronic apparatus is a radio telephone.

7. A telephone comprising:
   a transceiver which receives and transmits messages to a base station;
   a memory which stores a full menu;
   a customization unit which customizes said full menu to form a custom menu, said customization unit including a masking device which masks selected items of said full menu to form said custom menu;
   a screen which displays said custom menu; and
   a counter having a count which is initialized with a first predetermined count, said count being diminished in response to accessing a flag of one of said selected items, said one of said selected items being displayed on said screen when said count diminishes to a second predetermined count.

8. The telephone of claim 7, wherein said custom menu includes less items than said full menu.

9. The telephone of claim 7, further comprising a keyboard having a key which manually controls said masking device.

10. The telephone of claim 7, wherein said counter counts a number of times items of said full menu are accessed by a user to determine said selected items, said selected items being least frequently accessed elements of said full menu by said user, said counter controlling said masking device to mask said selected items.

11. The telephone of claim 7, wherein said counter counts a number of times items of said full menu are accessed by a user; and wherein said counter includes a modeling device which models behavior of said user when accessing said items, and an adaptation device which adapts said custom menu in response to said behavior.

12. The electronic apparatus of claim 1, wherein said flag includes four states.

13. The electronic apparatus of claim 1, wherein said second predetermined count is zero.

14. The telephone of claim 7, wherein said flag includes four states.

15. The telephone of claim 7, wherein said second predetermined count is zero.

* * * * *